US009194295B2

(12) United States Patent
Slayter et al.

(10) Patent No.: US 9,194,295 B2
(45) Date of Patent: Nov. 24, 2015

(54) LUBRICATION CUT-OFF AT HIGH SPEED

(71) Applicant: Hamilton Sundstrand Corporation, Windsor Locks, CT (US)

(72) Inventors: Matthew Slayter, Rockford, IL (US); James Vandung Nguyen, Rockford, IL (US); Jeffrey A. Stadler, Roscoe, IL (US); Timothy A. Johnson, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 387 days.

(21) Appl. No.: 13/684,765

(22) Filed: Nov. 26, 2012

(65) Prior Publication Data
US 2014/0144120 A1   May 29, 2014

(51) Int. Cl.
| F01D 25/18 | (2006.01) |
| F02C 7/06 | (2006.01) |
| F02C 7/32 | (2006.01) |
| B60R 17/02 | (2006.01) |

(52) U.S. Cl.
CPC . *F02C 7/06* (2013.01); *B60R 17/02* (2013.01); *F01D 25/18* (2013.01); *F02C 7/32* (2013.01); *F05D 2260/98* (2013.01)

(58) Field of Classification Search
CPC .......... F02C 7/06; F02C 7/32; F05D 2260/98; F01D 25/18; F01D 25/20; F16C 1/24; B60R 17/02
USPC .......................................... 184/6.11, 39, 45.1
See application file for complete search history.

(56) References Cited

U.S. PATENT DOCUMENTS

| 3,179,328 | A | * | 4/1965 | Pouit ............................ 417/369 |
| 3,366,427 | A | * | 1/1968 | Silver et al. .................. 384/103 |
| 3,520,578 | A | * | 7/1970 | Licht ............................. 384/104 |
| 4,244,181 | A | * | 1/1981 | Wiher et al. .................... 60/791 |
| 5,067,454 | A | * | 11/1991 | Waddington et al. ...... 123/196 S |
| 5,349,814 | A | * | 9/1994 | Ciokajlo et al. ............ 60/226.1 |
| 5,848,845 | A | | 12/1998 | Jeng et al. |
| 6,202,790 | B1 | | 3/2001 | Oligmueller |
| 6,299,561 | B1 | | 10/2001 | Kramer et al. |
| 6,357,922 | B1 | | 3/2002 | Harbottle et al. |
| 6,681,579 | B2 | * | 1/2004 | Lane et al. ...................... 60/787 |
| 7,216,473 | B1 | | 5/2007 | McArthur et al. |
| 7,640,723 | B2 | | 1/2010 | Alexander |
| 7,686,723 | B2 | | 3/2010 | Schondorf |
| 7,748,208 | B2 | | 7/2010 | Jewess et al. |
| 7,806,596 | B2 | | 10/2010 | Shatz et al. |
| 8,262,344 | B2 | | 9/2012 | Alexander et al. |
| 2002/0028725 | A1 | * | 3/2002 | Totsuka et al. .................. 477/45 |
| 2005/0061279 | A1 | | 3/2005 | Plenzler et al. |

FOREIGN PATENT DOCUMENTS

| EP | 1959143 A2 | 8/2008 |
| EP | 2600004 A2 | 6/2013 |

OTHER PUBLICATIONS

United Kingdom Search Report for United Kingdom Patent Application No. 1320286.6 completed on May 14, 2014.

* cited by examiner

*Primary Examiner* — Phutthiwat Wongwian
*Assistant Examiner* — William Breazeal
(74) *Attorney, Agent, or Firm* — Carlson, Gaskey & Olds, PC

(57) ABSTRACT

A mechanical system has a component to be lubricated that requires greater lubrication at lower speed conditions than would be required at higher speed conditions. A lubricant tower is biased to a position allowing a greater flow of lubrication to the component at lower speed conditions, then moved to a position at higher speed conditions where there is a lesser flow of lubrication.

8 Claims, 3 Drawing Sheets

US 9,194,295 B2

LUBRICATION CUT-OFF AT HIGH SPEED

BACKGROUND OF THE INVENTION

This application relates to a lubricant system for a component that requires more lubricant at lower speed than it may at higher speed.

Modern mechanical systems are becoming more and more complex. Mechanical transmissions including complex gear drives are included to drive various accessories and components associated with many systems. The intermeshed gears may transmit high torque and rotate at varying speed across the operation of the systems. Lubrication is required for the gears.

Typically, lubrication supply is tied to a speed of the system. In one example, lubrication is provided for gears to drive accessories associated with a gas turbine engine. The volume of lubricant delivered is proportional to the speed of the engine, and thus as engine speed increases so does the flow of lubrication. For most applications this is desirable. However, there are applications that require higher lubricant flow at lower speed. In such applications, a lubricant system that supplies lubricant in a volume proportional to the speed of the engine would be undesirable.

One such application would be a starter for a gas turbine engine. The starter must typically overcome the inertia of the engine components at start up and when the engine is at low speed. At these conditions lubricant is most needed by the gears in the starter to in turn drive components of the gas turbine engine. Conversely, at high speed those gears do not require lubrication.

SUMMARY OF THE INVENTION

A mechanical system has a component to be lubricated that requires greater lubrication at lower speed conditions than would be required at higher speed conditions. A lubricant tower is biased to a position allowing a greater flow of lubrication to the component at lower speed conditions, then moved to a position at higher speed conditions where there is a lesser flow of lubrication. A gas turbine engine is also disclosed.

These and other features of this application may be best understood from the following drawings and specification.

DETAILED DESCRIPTION

Figure 1:
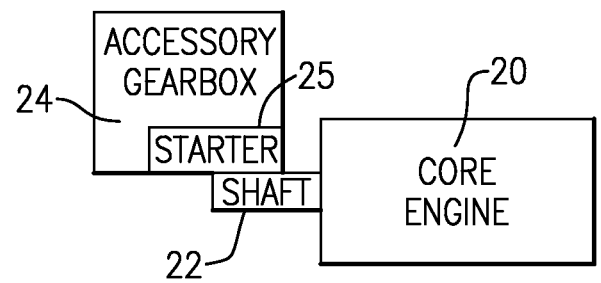
FIG. 1 schematically shows a gas turbine engine.

FIG. 1 schematically shows a gas turbine engine 19. A core engine 20 incorporates a fan, a compressor, a combustor, and a turbine, as known. The turbine drives a shaft 22. The shaft 22 engages an accessory gear box 24. The accessory gear box 24 may include a number of accessories which operate to support the operation of the engine 20. Examples may be a lubricant pump and a fuel pump for the engine.

One other component within the accessory gear box is a starter shown schematically at 25. The starter 25 engages the shaft 22 and begins to rotate the shaft 22 at start-up of the gas turbine engine 19.

Figure 2:
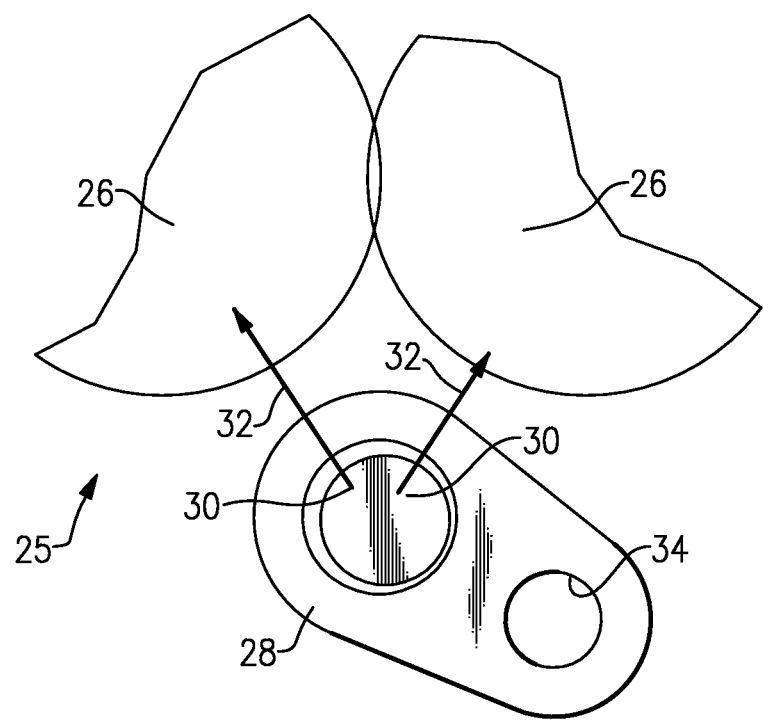
FIG. 2 shows a lubricant application point within the FIG. 1 gas turbine engine.

As shown in FIG. 2, the starter 25 may incorporate gears 26. The gears 26 require lubrication, and a lube tower 28 is shown which communicates with a supply of lubricant to supply oil 32 from orifices 30 to the gears 26. A hole 34 is shown to mount the tower 28 within the accessory gear box 24.

As mentioned above, the starter encounters high torque, and has a requirement for higher amounts of lubricant at start up. Once the engine has started, the torque and load on the gears 26 is dramatically reduced. Current lubricant systems, however, supply lubricant at flow rates which are proportional to the speed of the engine, and thus would supply more lubricant to the starter gears 26 at times when it is much less necessary to have the lubricant.

Other components which may require reduced lubricant flow under such conditions could be a journal bearing in an aircraft such as a military aircraft which sees a relatively low load during steady state altitude operating conditions. Thus, while this application specifically discloses its use for starter gears, it will extend to other components wherein the flow of lubricant is more critical at a lower speed application.

Figure 3:
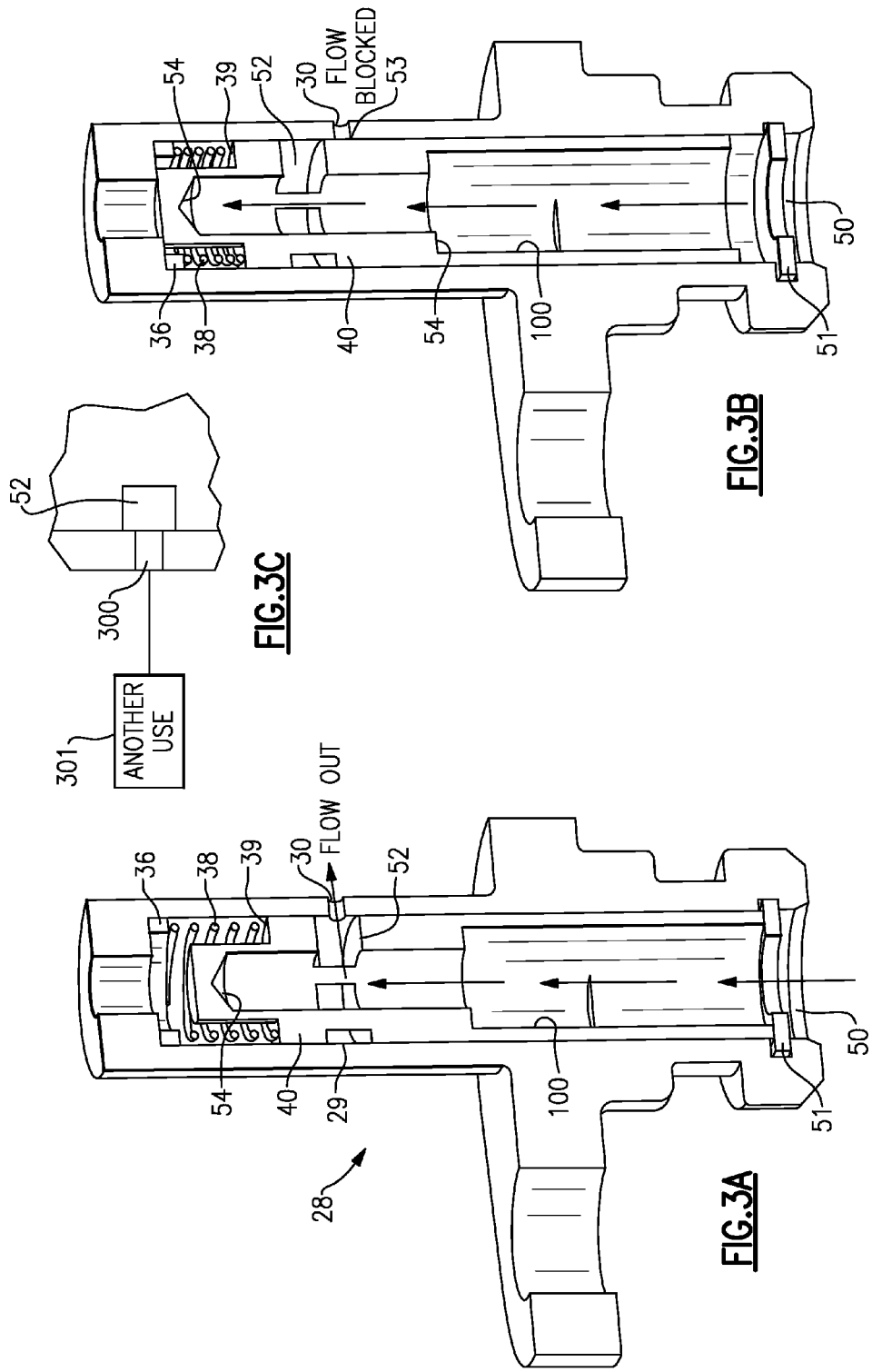
FIG. 3A shows a first embodiment lubricant supply.
FIG. 3B shows a second position of the FIG. 3A embodiment.
FIG. 3C shows an alternative embodiment.

FIG. 3A shows a first embodiment tower 28. A housing 29 provides a valve sleeve for a valve spool 40. A stop 36 provides a reaction surface for spring 38 against a land 39 on the valve spool 40. A step 51 prevents spool 40 from being forced out of housing 29. Lubricant is supplied to an inlet 50. The valve spool 40 has circumferentially positioned windows 52 which communicate with an orifice 30 and allow lubricant to pass from the inlet 50 through inner bore 100 to at least one window 52 and out the orifice 30 at low speed low pressure conditions.

The size of the window 52, and the orifice 30, may be sized such that a large volume of lubricant flow will occur in the position illustrated in FIG. 3A and at low speed conditions. In another embodiment, the position of the stop 36 is adjustable to allow for various spring heights to dial in the proper pressure set point.

FIG. 3B shows a higher speed condition. The pressure of the lubricant supplied to the inlet 50 has now increased. This is true because a lube pump is driven by the accessory gear box 24, and its output is proportional to speed. The lubricant reacts off surfaces 54 and drives the valve spool 40 upwardly against the force of spring 38. The window 52 no longer communicates with the orifice 30. Rather, a surface 53 on the spool 40 blocks the orifice 30. Now, lubricant will no longer be supplied to the gears, and may be directed elsewhere, where there is a greater need for lubrication at high speed conditions. While this embodiment completely blocks flow, this concept extends to arrangements where the flow is simply restricted.

FIG. 3C shows an alternative feature. When the valve spool 40 is in the FIG. 3B position, rather than simply blocking flow, flow from the window 52 may flow through a port 300 to another use 301. That is, rather than simply blocking flow, the tower 28 may redirect it to another component.

Figure 4:
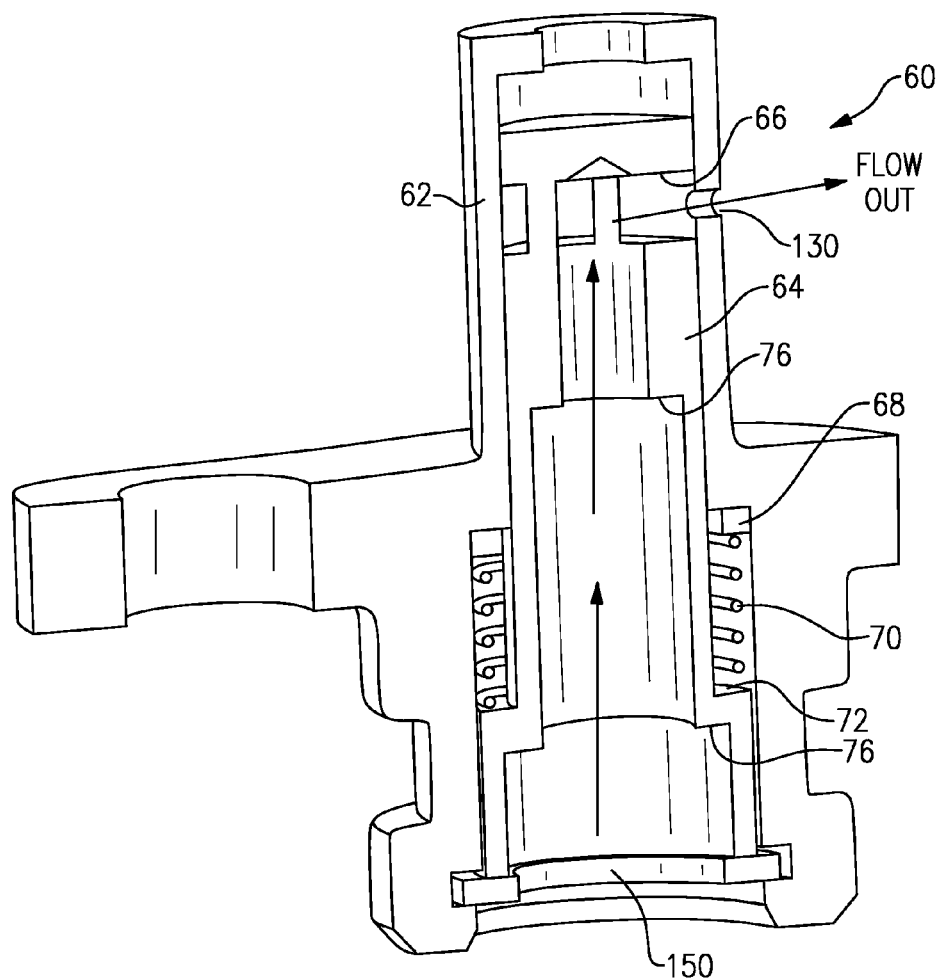
FIG. 4 shows another embodiment.

FIG. 4 shows an embodiment tower 60 which results in a somewhat smaller axial length due to the repositioning of a spring. In the embodiment 60, the window 66 is shown aligned with an orifice 130. The housing or valve sleeve 62 receives the valve spool 64 as in the prior embodiment. A spring stop 68 provides a reaction surface for a spring 70 and a land 72 on the spool 64 provides an opposed reaction surface. The valve spool 64 is held in the illustrated position at which lubricant can be supplied to the orifice 130. This is a low speed condition. As shown, surfaces such as 76 within the valve spool 64 will see the increased pressure as the speed, and hence the pressure of the lubricant passing into the inlet 150 of this embodiment increases. As this occurs, the spool 64 will be driven upwardly in this figure, and the window 66 will no longer communicate with the orifice 130.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
 a core engine including a compressor, a combustor, and a turbine, said turbine driving a shaft, said shaft driving an accessory gear box, and said accessory gear box connecting a starter for the gas turbine engine to said shaft, said starter including gears; and
 a lubricant tower having a valve, said lubricant tower in fluid communication with a source of a lubricant and said gears,
 said valve having a first position establishing fluid communication for a flow of said lubricant from said source to said gears through said lubricant tower, said valve having a second position obstructing said flow relative to said first position,
 wherein said valve is biased by a biasing force so as to be configured in said first position at low shaft speeds, and wherein said valve is moved in opposition to said biasing force to said second position as at high shaft speeds, said high shaft speeds being higher than said low shaft speeds.

2. The gas turbine engine as set forth in claim 1, said valve further comprising a valve spool, said valve spool having a first valve spool position establishing fluid communication for said flow from said source to said gears through said lubricant tower, said valve spool having a second valve spool position obstructing said flow relative to said first position, wherein said valve spool is biased by the biasing force so as to be configured in said first valve spool position at low shaft speeds, and wherein said valve spool is moved in opposition to said biasing force to said second valve spool position as at high shaft speeds.

3. The gas turbine engine as set forth in claim 2, wherein at high shaft speeds the valve spool completely blocks said flow.

4. The gas turbine engine as set forth in claim 3, wherein said valve comprises a valve sleeve receiving said valve spool and said valve spool includes a window establishing fluid communication for said flow from an internal bore in the valve spool through an orifice in an outer wall of the valve sleeve receiving said valve spool.

5. The gas turbine engine as set forth in claim 2, wherein said biasing force is provided by a spring, said spring being positioned at an axial end of said valve spool.

6. The gas turbine engine as set forth in claim 2, wherein said biasing force is provided by a spring, said spring being provided at an intermediate location on said valve spool.

7. The gas turbine engine as set forth in claim 1, wherein at said higher shaft speeds, lubricant from said lubricant tower is directed to at least one components distinct from said gears.

8. The gas turbine engine as set forth in claim 2, wherein said biasing force is provided by a spring, said spring being positioned at an axial end of said valve spool.

* * * * *